2 Sheets—Sheet 1.

P. K. DEDERICK.

Baling-Press.

No. 7,983. Reissued Dec. 11, 1877.

Witnesses.

Harry King

F. McKenny

Inventor.

Peter K. Dederick

By Hill Ellsworth

His Attys.

N. PETERS, Photo-Lithographer, Washington, D. C.

2 Sheets—Sheet 2.

P. K. DEDERICK.
Baling-Press.

No. 7,983. Reissued Dec. 11, 1877.

Witnesses.

Harry King Del.

F. McKenny.

Inventor.

Peter K. Dederick
By Hill Kellogg
His Attys.

N. PETERS, Photo-Lithographer, Washington, D. C.

UNITED STATES PATENT OFFICE.

PETER K. DEDERICK, OF ALBANY, NEW YORK.

IMPROVEMENT IN BALING-PRESSES.

Specification forming part of Letters Patent No. 132,639, dated October 29, 1872; Reissue No. 7,983, dated December 11, 1877; application filed July 27, 1877.

DIVISION A.

*To all whom it may concern:*

Figure 1:
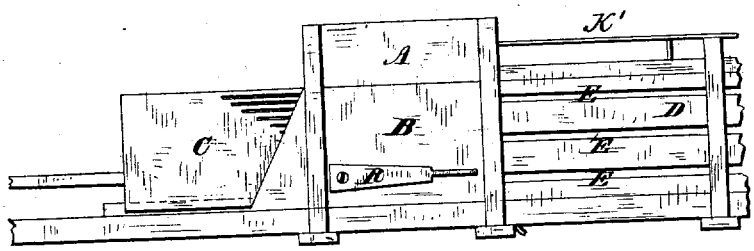
Figure 2:
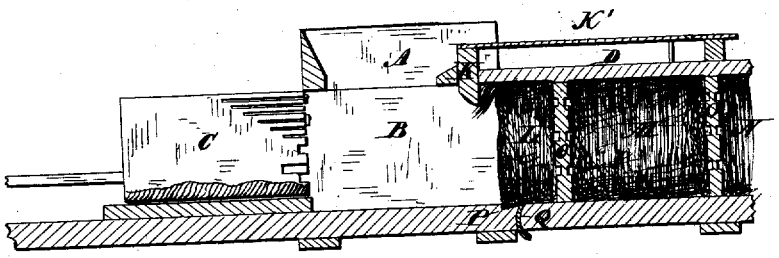
Figure 3:
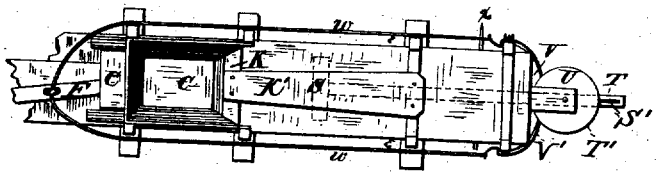
Figure 5:
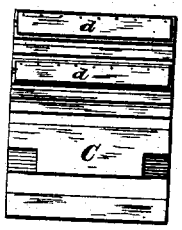
Figure 4:
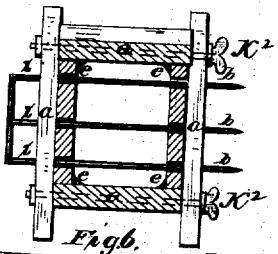
Figure 6:
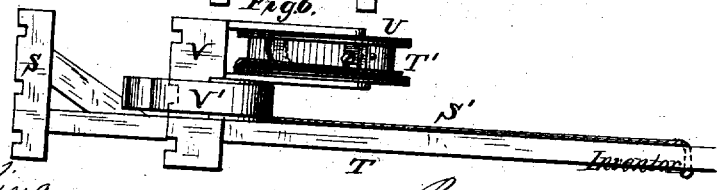

Be it known that I, PETER K. DEDERICK, of the city of Albany, in the county of Albany and State of New York, have invented a new and Improved Baling-Press, of which the following is a specification:

Figure 1 is a side view of the principal parts of the machine. Fig. 2 is a sectional elevation, showing the working parts and manner of operation. Fig. 3 is a top view, also illustrating the working parts and their operation. Fig. 4 is a sectional view of the end of the bale-chamber. Fig. 5 is a sectional or face view of the traverser, showing the guards to the slots; and Fig. 6 is a side elevation of the end door and its attachments.

In Fig. 1, A is the hopper, into which the loose hay or other material is placed. B is the press-box, into which it falls by its own gravity, and in which it is pressed by the traverser C and forced into the bale-chamber D. E E E are the tying-slots, through which ties are inserted, there being corresponding slots on the opposite side of the box.

In Fig. 2 the same letters denote the same parts, as also in all other figures.

K is the folder or doubler, which forces or doubles down the hay overlapping the traverser as soon as the traverser is withdrawn, thus forming the side of the bale smooth. It is also a spring-seated retainer, to retain the pressed material. This device may be of either roller or wedge form, and projected below the hopper and into the press-box, so as to turn down and retain the ends, which are then secured by the next charge. It may be operated by spring, as shown, or weight, or by attaching it to the traverser or power, if desired, as what is required is simply to project a folder within the box against the overlapping ends.

L is the forming bale; M, the finished bale; N, the bale being discharged. O O are the grooved followers for separating the bales and passing the ties. These may be constructed of any material. P represents the shoulders for retaining the hay, and may extend around the entire box. They are formed by recessing the lining, which is then beveled back to the inside of the lining. The hay is pressed or expands behind the shoulders into this recess, and is retained against the shoulders. The hay, when it reaches these recesses, expands into them, and as it is forced along by the traverser the inclination of the bevel to the inner surface of the bale-chamber increases the friction between the compressed hay and such surface, and even after the hay-sections leave the recesses and pass into the chamber the friction is increased, because of the forced contraction of the hay in leaving the recesses.

Q and R are self-operating retaining-guards, and K is a spring-seated retainer or folder. The retaining-guards Q are short metal pieces pivoted to the press, so that their upper ends shall extend within the chamber, and when the material being pressed is moved within the chamber the upper ends of these guards swing down and allow it to pass; but when the pressed material expands back by the withdrawal of the traverser, it engages the ends of the guards, and swings them up to prevent the further backward expansion of the pressed material.

The retaining-guard R may be formed from any suitable material, so as to constitute a spring, having one end secured to the press, and having an edge or shoulder projected within the chamber, against which the section of material and the followers are retained after being forced past them.

The retainer and folder K is secured to a spring-board, K′, and is projected by it within the chamber when the traverser is withdrawn, thus folding down the overlapping ends of the hay or the material being pressed, and also retaining the sections of such material and the followers by means of its edge, which projects within the chamber.

These retaining devices may be used separately or together.

The bale-chamber is constructed adjustable at its discharge end on two or more of its sides, as at E E, and may be forced in or expanded by means of rods and nuts, as shown at $K^2$, Fig. 4, or any other suitable means, so that the walls of the chamber are adjusted toward or away from each other, at the will of the operator, for the purpose of increasing or diminishing the friction.

The walls of the chamber may be constructed stationary and converging or smaller toward the discharge end than where the material is pressed, with a similar effect, but could not be so readily adjusted to produce the desired amount of friction.

In Fig. 4, *a a a a* are the ends of the sides of the bale-chamber, which gives form to the bale, and is square or rectangular with small pieces *e e e*, Fig. 4, formed or inserted in the corners, so as to form a rounding or beveled corner, or to remove the sharp corners to a square or rectangular form of bale.

In Fig. 5, *d d* are plates overlapping the spaces or slots in the traverser C, as shown, thus preventing the compressed hay from crowding between the slats, and securing free play to the springs when the hay overlaps the traverser.

In Fig. 3, V is the end door, secured transversely to a curved metal strip, V′, the ends of which extend beyond opposite edges of the door, and are provided with shoulders to engage with the two side uprights at the discharge end of the baling-chamber. The metal strip V′ is made elastic, so as to spring over the uprights when the door is in place, and to be freed therefrom when the requisite pressure is brought against the door by the pressed material within the baling-chamber.

S is a friction-follower, of such size as to pass within the chamber, and is provided with a staff, T, which passes through the door V, as shown. Its outer end is connected by a rope or chain, S′, to a metal friction-strap, T′, passing around the periphery of a wheel or grooved block, U, secured to the door, as shown in Fig. 6. The friction-strap is made adjustable, by any suitable means, to increase or decrease the friction between it and the wheel.

When the bale within the baling-chamber of the press is, by the operation of the traverser and its connections, pressed against the friction-follower, it is moved back to the discharge end of the press, the staff T sliding through the end door, and drawing upon the rope S′, so as to turn the friction-strap upon its wheel, the requisite turns of the rope being taken around the strap for the purpose, as will be readily understood, until the follower is brought against the door, and the latter thrown open to disclose the bale.

It will be seen, therefore, that the degree of force requisite for moving the follower is regulated by adjusting the pressure of the strap upon its wheel.

*w w* are lines connecting the ends of the curved door-strap V′ to the power, in any suitable manner, so that, after the end door is thrown open, the backward movement of the traverser will close it, or draw it again into the end of the baling-chamber.

This arrangement is of use only at rare intervals, as ordinarily the door is replaced or adjusted by hand.

*x* is the guard or tie-inserter, consisting of a head, with arms to correspond to the slats in the sides of the bale-chamber, and is used for passing the ties and dividing the bales, and to prevent the hay from expanding out of the box.

This press is available for different methods of operation. The hay or other material is thrown into the hopper A, and falls of its own gravity into the press-box B, from whence it is forced into the bale-chamber D by the traverser C, thus forcing the retainers Q R K back on a line with the inside of the box. Meantime the material for the next charge is thrown into the hopper on the top of the traverser, which thus forms an adjustable bottom to the hopper. The traverser is then withdrawn, and the hay within the hopper falls into the press-box. Meantime the hay is retained by the retainers Q R K, which are projected within the box, in the rear of the pressed material, the latter also folding down the hay overlapping the traverser, and the operation is thus continued until the bale-chamber is filled, thus forming a bale the entire length of the chamber. The bale is then tied off, and another bale is commenced in like manner, but against the finished bale as a head, thus ejecting it from the box; and the operation is thus continued, the completed bales being successively used as the head or resistance to the press, for the purpose of forming or pressing fresh material for the next bale.

In the previous operation the first bale will be rough, in consequence of having no resistance to commence against; but by the use of the friction-follower and strap this is avoided, as follows: The material is fed into the press-box B, as in the former case, and forced into the bale-chamber D, thus forcing the friction-follower S back, and the operation is thus continued, each additional section forcing it farther back until the chamber D is filled; the bale is then tied off and the door V removed. The friction-follower and staff is now of no further use, but is removed, and the next bale commenced against the finished bale as a head, as in the preceding case, thus ejecting it from the box. If the bale is very compact the guard or tie-inserter may be required, to prevent the hay forming the unfinished bale from expanding out with the finished bale. The door V is then closed and the second bale completed.

The ties or hoops are attached to the ends of the cams of the guard at *b b b*, and all drawn through in removing the guard, which is then inserted through at the opposite end of the bale, for the same purpose, and the operation is thus continued, each successive bale being used as a head or resistance, for the purpose of forming or pressing additional material for another bale.

This press is also a continuous baling-machine, by a slight change in the operation, as follows: The first bale is pressed as in former case. The sides of the box E E are then set or screwed up, so as to impinge or form an additional friction on the bale, if required, when forced along by the new charges in forming the next bale, and one of the followers O, with tying-grooves, is inserted in the press-box in the rear of the finished bale, and forced along with the bale, as at L M, both followers and hay being retained from expanding back by the retainers Q R K.

The operation is thus continued until another bale is formed, when another follower is inserted, and the operation is still continued, thus forming a third bale while the second bale is being tied off and the first bale being ejected. The finished bales, as in former cases, successively form the head, for the purpose of forming or pressing succeeding bales. The operation is thus continued without stopping, one man filling the box and another tying off.

I do not claim the process of ejecting the bale herein, as such claim is included in another application.

Having thus described my invention, I claim as follows:

1. The folder K, projected within the press-box B, for the purpose set forth.

2. The guard X, in combination with the slots E and bale-chamber D, for the purpose set forth.

3. In a horizontal baling-press in which the bales are compressed and ejected through the end, the bale-chamber D, constructed with tapering or adjustable sides, to regulate the resistance offered to the passage of the bale, for the purpose of compressing and hardening it, substantially as described.

4. The traverser C, provided with guards *d*, for the purpose set forth.

5. The press-head formed of the previously-completed bale, substantially for the purpose set forth.

6. The follower O, constructed with grooves on both sides for the ties, in combination with the bale-chamber D, provided with slots E, substantially for the purpose set forth.

7. The beveled or rounded corners of the bale-chamber or press-box, for the purpose set forth.

8. In a horizontal baling-press in which the hay is pressed in sections, as set forth, movable shoulders or retainers projected within the chamber in the rear of the pressed material, for the purpose set forth.

9. The receptacle or chamber D, provided with the tying-slots E, and hinged spring or spring-seated retainers, for the purposes specified.

10. The reciprocating traverser C, in combination with the horizontal receptacle and chamber B D, provided with hinged spring or spring-seated retainers, for the purpose set forth.

11. The follower O, as the partition or separation between the finished and forming bale, as set forth.

PETER K. DEDERICK.

Witnesses:

W. A. SKINKLE,

C. R. DEDERICK.